J. A. FRAUENHEIM.
COMPOUND BOLT.
APPLICATION FILED JAN. 27, 1914.

1,135,515.

Patented Apr. 13, 1915.

WITNESSES
R A Balderson
D B Bleming

INVENTOR
J. A. Frauenheim,
by Bakewell, Byrnes Parmelee
Attys.

UNITED STATES PATENT OFFICE.

JOSEPH A. FRAUENHEIM, OF ZELIENOPLE, PENNSYLVANIA, ASSIGNOR TO KERNER MANUFACTURING COMPANY, OF PITTSBURGH, PENNSYLVANIA, A CORPORATION OF PENNSYLVANIA.

COMPOUND BOLT.

1,135,515.  Specification of Letters Patent.  Patented Apr. 13, 1915.

Application filed January 27, 1914. Serial No. 814,702.

*To all whom it may concern:*

Be it known that I, JOSEPH A. FRAUENHEIM, a citizen of the United States of America, residing at Zelienople, in the county of Butler and State of Pennsylvania, have invented a new and useful Improvement in Compound Bolts, of which the following is a full, clear, and exact description, reference being had to the accompanying drawings, forming part of this specification, in which—

Figure 1:
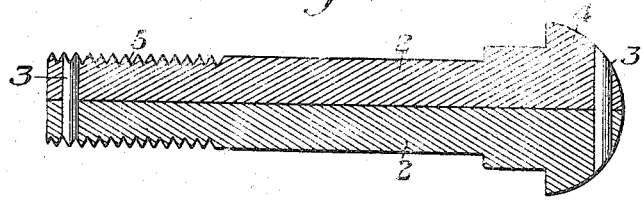
Figure 2:
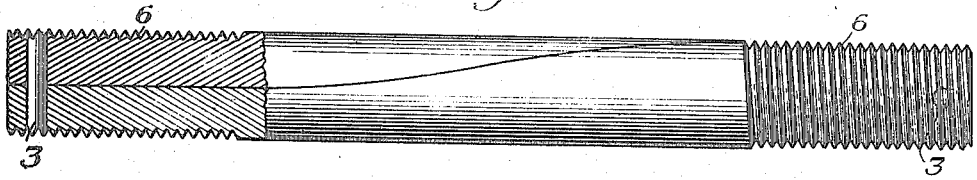
Figure 3:
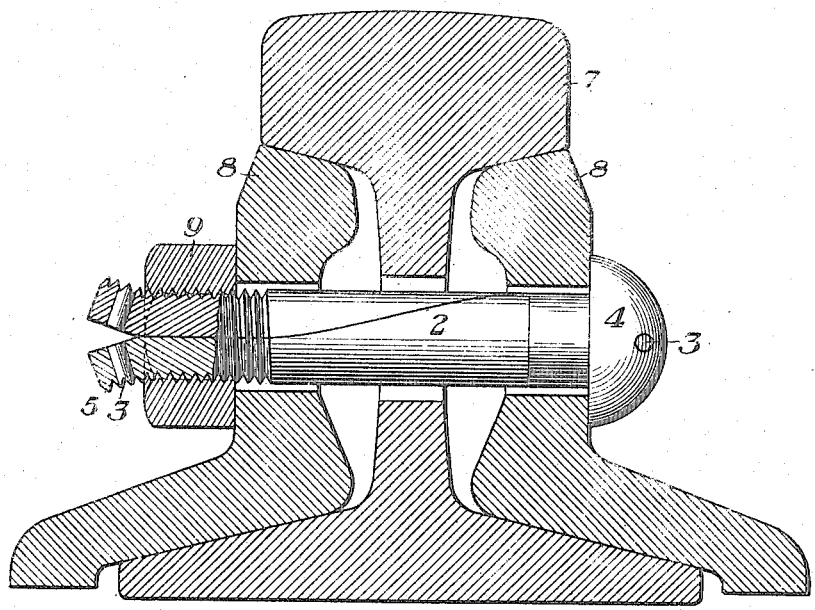

Figure 1 is a longitudinal section through one form of bolt made in accordance with my invention. Fig. 2 is a side elevation partially in section of another form of bolt. Fig. 3 is a transverse section through a rail joint showing one of my bolts applied.

This invention relates to an improvement in compound bolts having a plurality of members either of which is arranged to move with relation to the other.

It is well known to those familiar with the art, and particularly with railway track construction, that various devices are used to keep the nuts tight on the bolts, as the continual pounding of the wheels on the joints of tracks, as well as the continual pounding on the switches and frogs, loosens the nuts holding the parts in their assembled position.

The object of my invention is to provide a bolt in which one of the members of the bolt can move relative to the other member, thereby compensating for the twisting stresses to which the various members are subjected, which will avoid the loosening of the nuts on the bolts.

The precise nature of my invention will be best understood by reference to the accompanying drawings, which will now be described, it being premised, however, that various changes may be made in the details of construction of the bolt, without departing from the spirit and scope of my invention as set forth in the appended claims.

In the drawings, the reference numeral 2 designates the two members of the bolt. The ends of these members I have shown as temporarily secured to each other by means of pins 3 extending through the two members.

In Fig. 1, I have shown the ordinary form of track bolt having a head 4 and a threaded portion 5 at the other end.

In Fig. 2, I have shown a bolt which is provided with a threaded portion 6, 6, at each end, and which is more particularly designed for securing the various members of a frog to each other.

In making the bolt such as shown in Fig. 1, I take two pieces of semicircular stock, preferably of steel, and upset the half heads and shoulder portions on one end thereof. I then secure the members to each other by means of the pins 3 close to the ends of the two members. One end of the bolt is then threaded, as indicated at 5 in Fig. 1, and after the bolt is placed in position, the through pins 3 may be driven out or separated, as indicated in Fig. 3.

The two members forming the bolt are twisted about each other, preferably about 90 degrees and not to exceed 180 degrees, the spiral of the twist extending in the opposite direction to the spiral of the threads on the end of the bolt.

In Fig. 2 I have shown a construction in which both ends are threaded.

In Fig. 3, 7 designates the usual T-rail, the ends of adjacent members of the rail being secured to each other by means of fish plates 8, which are in turn held in place against the heads and bottom flanges of the rail members by means of a bolt such as shown in Fig. 1, in which the two members are twisted about the axis of the bolt. After the bolt has been placed in position and the nut 9 drawn tight, the ends of the members are spread apart, and during the spreading action, the pin 3 may be cut by the spreading tool. The pin 3 passing through the head can also be severed or driven out, and if the same is not removed, the movement of the two members with relation to each other will soon shear the same, so that one member will be free to move with relation to the other member, and thereby compensate for twisting strains which are set up in the parts held together by means of the bolt. The spreading of the ends of the two members will also assist in maintaining the nut in its proper position.

It is well known to those familiar with this art, that the heads of bolts and nuts of this character are not machined, which is also true of the faces of the members against which the faces of the nuts and heads abut, so that very frequently the nut or head will only be in contact at one side of the center of the bolt. By the use of a structure such as shown and described by me, the nuts and bolt heads will seat on each side of the bolt, and thereby provide a bolt which is better adapted to retain the parts in position and prevent the nut from loosening.

The advantages of my invention result from the provision of a bolt having a plurality of members twisted about each other and which are arranged to move with relation to each other when secured in position. Further from the provision of a bolt in which the members are adapted to move relative to each other when the nut is rotated to unloose the same, which movement will tend to lock the nut from movement.

I claim:

1. A bolt having a plurality of members which are separate throughout the entire length of the bolt, said members being twisted about the longitudinal axis of the bolt, and screw threads on one end of said bolt.

2. A bolt having a plurality of members which are separate throughout the entire length of the bolt, said members being twisted about the longitudinal axis of the bolt, screw threads on one end of said bolt, and a head on the other end of said bolt.

3. A bolt having a plurality of separate members threaded at one end, said members being twisted about the longitudinal axis of the bolt, the spiral of the twist extending the reverse direction to the spiral of the thread.

4. A bolt having a plurality of separate members threaded at one end, said members being twisted about the longitudinal axis of the bolt, the spiral of the twist extending the reverse direction to the spiral of the thread, and a head on the other end of said bolt.

In testimony whereof, I have hereunto set my hand.

J. A. FRAUENHEIM.

Witnesses:
JESSE B. HELLER,
GEO. B. BLEMING.